(12) United States Patent
Razzell et al.

(10) Patent No.: US 8,002,517 B2
(45) Date of Patent: Aug. 23, 2011

(54) SENSOR

(75) Inventors: Anthony G. Razzell, Derby (GB); Lee Mansfield, Derby (GB); Leo V. Lewis, Kenilworth (GB)

(73) Assignee: Rolls-Royce PLC, London (GB)

( * ) Notice: Subject to any disclaimer, the term of this patent is extended or adjusted under 35 U.S.C. 154(b) by 935 days.

(21) Appl. No.: 11/905,589

(22) Filed: Oct. 2, 2007

(65) Prior Publication Data

US 2008/0247863 A1 Oct. 9, 2008

(30) Foreign Application Priority Data

Oct. 31, 2006 (GB) .................................. 0621620.4

(51) Int. Cl.
*F04D 29/08* (2006.01)

(52) U.S. Cl. .......... 415/14; 415/118; 415/126; 415/127; 415/128; 415/173.1; 416/61

(58) Field of Classification Search ............. 415/14, 415/118, 126, 127, 128, 173.1; 416/61
See application file for complete search history.

(56) References Cited

U.S. PATENT DOCUMENTS

| | | | |
|---|---|---|---|
| 4,482,859 A | | 11/1984 | Fournier |
| 4,876,505 A | * | 10/1989 | Osborne ............. 324/207.25 |
| 5,101,165 A | * | 3/1992 | Rickards ................ 324/662 |
| 5,119,036 A | * | 6/1992 | Rickards et al. ........... 324/662 |
| 5,166,626 A | * | 11/1992 | Hester et al. ............ 324/690 |
| 5,818,242 A | * | 10/1998 | Grzybowski et al. ........ 415/14 |
| 6,401,460 B1 | * | 6/2002 | Xia ................... 415/14 |
| 6,692,222 B2 | * | 2/2004 | Prinz et al. ............ 415/14 |
| 2006/0140756 A1 | * | 6/2006 | Schwarz et al. ......... 415/173.2 |

FOREIGN PATENT DOCUMENTS

| | | |
|---|---|---|
| GB | 2 245 070 A | 12/1991 |
| GB | 2 314 631 A | 1/1998 |
| GB | 2 325 305 A | 11/1998 |
| GB | 2 406 381 A | 3/2005 |
| GB | 2 416 848 A | 2/2006 |
| WO | WO 97/40340 A1 | 10/1997 |

* cited by examiner

*Primary Examiner* — Igor Kershteyn
(74) *Attorney, Agent, or Firm* — Oliff & Berridge, PLC

(57) ABSTRACT

Sensors (32, 52, 72) for determining a gap between a conductive member (34, 54, 74) such as a blade in a gas turbine engine and a seal segment (31, 51) are known to use capacitive variants in order to create an electrical signal indicative of the gap width. Thermal disparities can create problems with regard to sensor aging and accuracy. By creating a sensor incorporating a metal rod (33, 53, 74) typically integrally formed or associated with the seal segment (31, 51) and coupled through inductive coupling loops (35, 36; 55, 56; 75) it is possible to create a tuned circuit with a Q value which is more stable and therefore acceptable with regard to producing more accurate results at elevated temperatures with less problems with regard to thermal disparities.

20 Claims, 4 Drawing Sheets

SENSOR

The present invention relates to sensors and more particularly to sensors utilised to determine relative movement in a gap between electrically conductive components such as with respect to a blade tip within a gas turbine engine.

Referring to FIG. 1, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine 10 operates in a conventional manner so that air entering the intake 11 is accelerated by the fan 12 which produce two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts.

It will be appreciated in view of the above with regard to gas turbine engines and other situations that accurate determination of variations in gaps and spacings between components is important. An example of such a determination requirement is between blade tips of the compressors 13, 14 and turbines 16, 17, 18 and associated casing parts such as seal segments. However, traditional approaches have difficulties with respect to elevated temperatures typical within a gas turbine engine.

Capacitive probes operate well at low temperatures (for example in compressors), but their life is limited at temperatures encountered by a turbine within a gas turbine engine. In a fully active tip clearance system in which actuation is applied independently on the casing, the seal segment is connected to an actuator which may move relative to the casing by up to 1 mm or possibly more. Flexing of the co-axial cable during this movement or through differential thermal movements causes failure to occur. A further disadvantage is that such capacitive probes have a sensor with co-axial cable which is attached to the seal segment which may complicate assembly of a turbine module. A further disadvantage is that any ceramic insulation has a significant thermal expansion mis-match with the metal probes and dielectric properties vary with temperature and suffer contamination when conductive or semi-conductive material is deposited upon them. In accordance with aspects of the present invention there is provided a rotor assembly comprising a radially outwardly positioned housing, the seal segment comprising a sensor to determine relative movement of the rotor, the sensor comprising a tuned circuit arranged to have a frequency modulated electrical capacitance response relative to a gap between a conductive member and a sensor head secured in the housing, the sensor characterised in that the sensor head and the housing are integrally formed to diminish thermal disparity effects upon the capacitance response.

Preferably, the housing comprises a seal element.

Preferably, the sensor head comprises a metal rod or cylinder extending through an aperture in the housing. Advantageously, there is a minimum clearance between the metal rod or cylinder and the aperture. Possibly, the metal rod and cylinder between earthed end and a centre of the metal rod or cylinder has a length equivalent to a quarter wavelength of a signal at the oscillation frequency for the tuned circuit.

Preferably a capacitor is formed between the housing and the conductive member.

Preferably, the tuned circuit is coupled to a remote electronic circuit by one or two low impedance coupling loops. Possibly, the electronic circuit is an amplifier. Generally such low impedance coupling loops are a fraction of the effective length between the earthed end and the centre of the rod relative to the oscillating frequency of the tuned circuits. Preferably, the low impedance couplings are inductive loops. Possibly, the low impedance couplings are capacitive.

Preferably, the low impedance loops in combination with the coaxial cables and amplifier provide feedback at the correct phase to sustain oscillation. Preferably, the sensor provides a phase shift in the order of 360° in order to sustain oscillations.

Preferably there is an air gap between the metal rod/cylinder and the aperture.

Preferably a ceramic seal is provided remote from the metal rod or cylinder and surrounding aperture association and positioned to inhibit leakage therethrough. Preferably, the ceramic seal allows association with hot or high temperatures.

Embodiments of the present invention will now be described by way of example only and with reference to the accompanying figures in which:—

Figure 7:
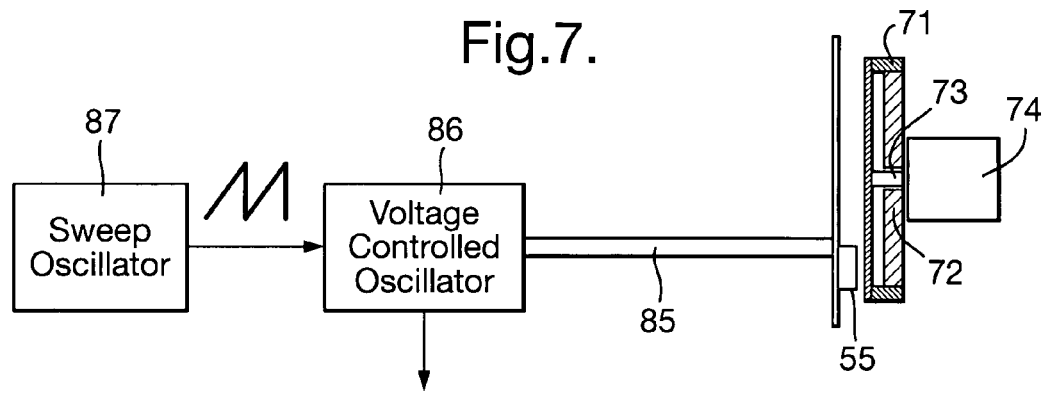
FIG. 7 is a schematic illustration of a further alternative embodiment of a sensor in accordance with aspects of the present invention.
Figure 8:
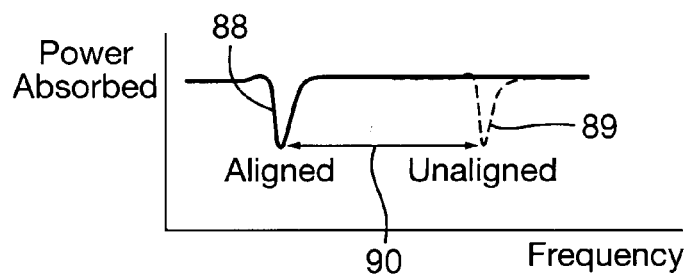
Figure 9:
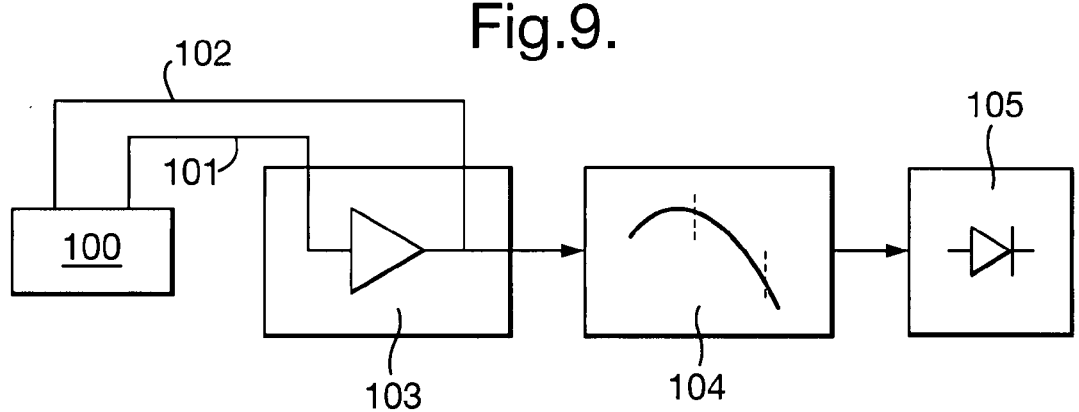
Figure 10:
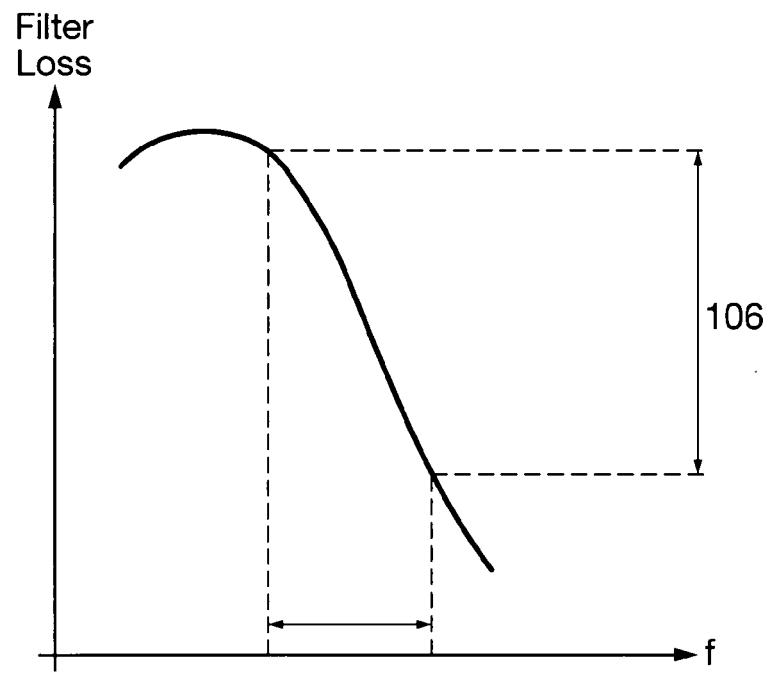

FIG. 8 provides a graphic representation of power absorbed against frequency for the embodiment of aspects of the present invention depicted in FIG. 7;

FIG. 9 is a schematic of a de-modulation circuit in accordance with the present invention; and FIG. 10 is a graph representing filter loss due to frequency modulation from an oscillator.

As indicated above problems with regard to use of capacitance sensors to determine in particular gap variation relates to thermal disparities in the sensor at elevated temperatures. In situations such as gas turbine engines where relatively high temperatures are operative it is known that sensor life can at least be shortened and unreliability with respect to sensor operation is possible.

In accordance with aspects of the present invention a sensor head is provided which is integrally formed with a housing such as a seal segment rather than as a separate item. Although a separate sensor could be added to simplify manufacture if necessary. A similar material may be used to minimise differential thermal effects.

A sensor in accordance with aspects of the present invention forms a tuned circuit consisting of a metallic rod or cylinder which extends through a hole or aperture in the seal segment with a small and generally minimalised clearance either side. This arrangement forms a capacitor with the surrounding seal segment and an associated conductive member such as a blade tip in a gas turbine engine compressor or turbine stage. The metallic rod or cylinder acts as a half wavelength transmission line, that is to say a quarter wavelength there and back capacitively tuned about its centre. The earth ends thus have no effect on the operation of the tuned circuit. The tuned circuit is coupled to a remote amplifier via two low impedance coupling loops. Typically a proportion of the effective quarter of wavelength length between the earthed end of the metallic rod or cylinder and the centre is constituted by the impedance coupling loops which limit the electrical loading on the tuned circuit, achieve a reasonable Q factor and minimise detuning effects from surrounding components. The impedance coupling loops are generally inductively coupled with the sensor and seal segment. Alternatively, capacitive coupling may be employed.

The sensor when assembled as outlined above acts as a tuned filter with a centre frequency related to the inductance and capacitance of the metallic rod and formed capacitor between that rod and the seal segment/associated conductor member (blade tip). In such circumstances as the conductor member passes the capacitor, the resultant in frequency change that occurs is therefore related to the seal segment to conductive member (blade tip) gap. A remote amplifier acts to sustain oscillation in which feedback occurs via the tuned filter. This allows the resonant frequency of the tuned circuit to be measured.

Figure 1:
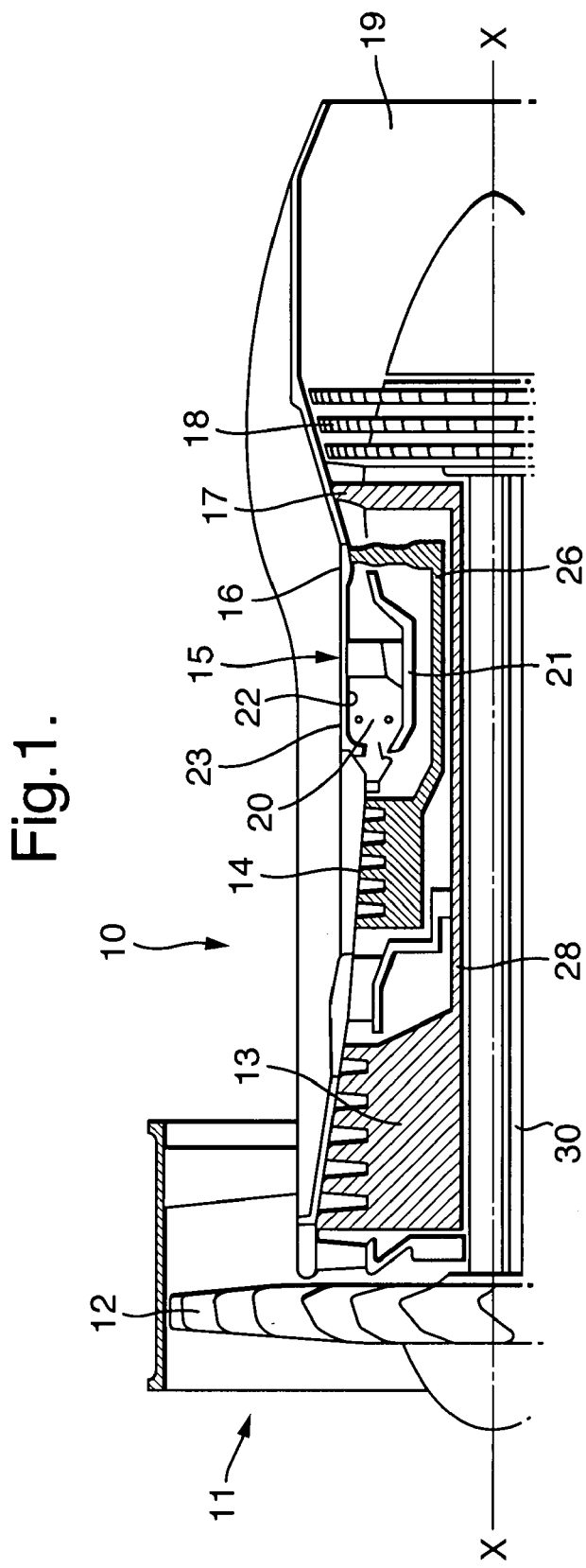
FIG. 1 is a schematic part-section of a gas turbine engine.
Figure 2:
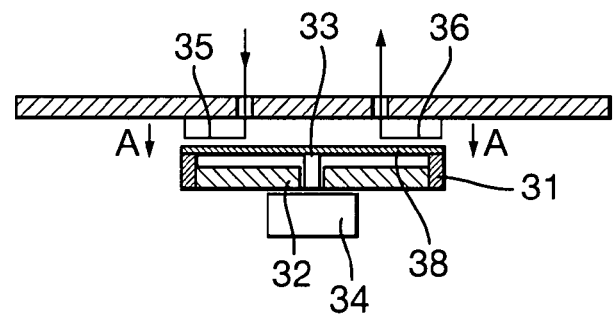
FIG. 2 is a schematic side illustration of a sensor in accordance with aspects of the present invention.
Figure 3:
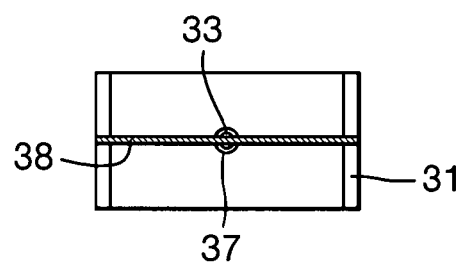
FIG. 3 is a plan view across the sensor as depicted in FIG. 2.

FIGS. 2 and 3 respectively illustrate a sensor in accordance with aspects of the present invention respectively as a cross-section in FIG. 2 and a plan view in the direction of arrowheads A in FIG. 3. In such circumstances it will be understood that a seal segment 31 is formed as described above with a capacitor 32 defined between a metallic rod or cylinder 33 and the segment 31 associated with a conductive member 34 typically in the form of a blade tip. As indicated generally the rod 33 provides a quarter wavelength effective distance for the sensor with respect to earth.

As can be seen the rod 33 is generally suspended across the seal segment 31 such that the rod or cylinder 33 is suspended in an aperture 37 with a limited or minimised gap between the rod or cylinder 33 and the aperture 37. The rod is suspended upon an inductance bridge 38 which as indicated through the inductance loops 35, 36 are coupled to an amplifier. This amplifier will present signals as an oscillation frequency to the sensor and it is variations in this oscillation frequency and signal which are detected in order to determine through an appropriately demodulated electrical signal variations in the gap between the conducting member 34 and the cylinder or rod 33.

Figure 4:
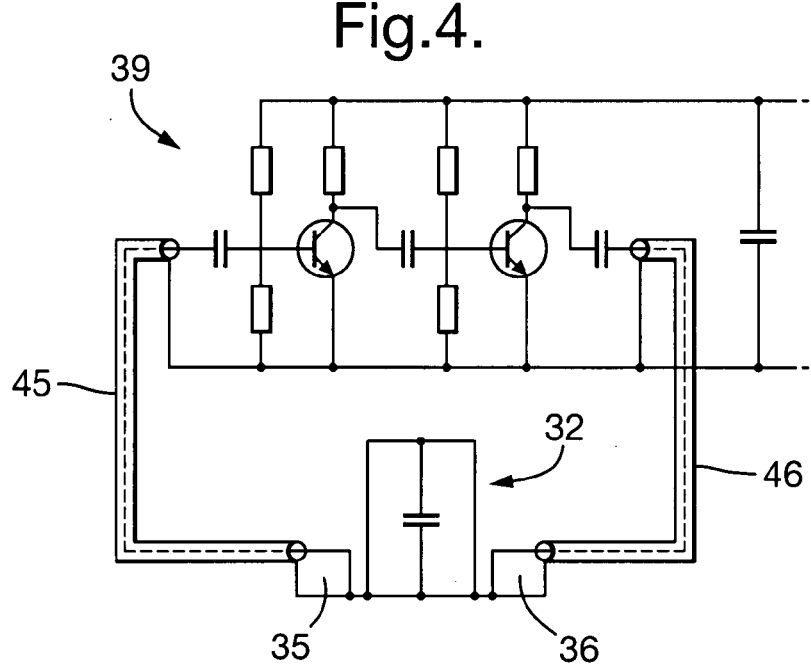
FIG. 4 is a representative circuit with regard to a sensor and oscillator in accordance with aspects of the present invention.

FIG. 4 provides a representative circuit with regard to a sensor in accordance with the embodiment depicted in FIGS. 2 and 3. Similar reference nomenclature has been utilised for comparison. Thus, a capacitor sensor 32 is created which is associated through low impedance coupling loops 35, 36 to an oscillator 39 of a generally known configuration. The nominal phase shift through the system 39 is in the order of 360° to allow sustained oscillation. Thus, the associated oscillator components present an oscillation frequency to the capacitive sensor 32 through the co-axial cables 45, 46 and impedance coupling loops 35, 36. As indicated above, the arrangement is generally configured such that there is a high Q factor, that is to say a low electrical loading on the tuned circuit other than as a result of displacement between a conductive member and the sensor 32. In such circumstances accurate results should be provided with regard to variations in the gap between that conductive member and the sensor 32.

As the cylinder/rod is integrally formed with the seal segment and/or the impedance coupling loops have no physical contact, it will be understood that the thermal disparity created by elevated temperatures will have limited effects upon the inherent initial set up configuration with regard to achieving an overall phase shift close to 360°.

As indicated above, generally by aspects of the present invention, the sensor is an integral part of the seal segment provided. The rod and other parts could be cast as part of the seal segment and then an air gap for the capacitor machined by EDM or a similar process of in situ cutting and forming. In such circumstances in view of the close nature of such an air gap the need for a high temperature ceramic insulator is eliminated. However, it will be appreciated that an insulator may be provided in a slightly cooler position in order to reduce leakage across the seal segment. It will also be understood that by use of inductive couplings the need for a physical electrical connection to the lead out co-axial cables is removed again reducing a life limiting problem associated with prior capacitive probes. It will also be understood the connection to the inductive coupling loop at the end of the co-axial cable is in a lower temperature environment than is the capacitive probe reducing the likelihood of thermal fatigue causing failure of the electrical connection.

By use of an air gap between the metal rod and the aperture of the seal segment it will be understood that there will be a reduction in thermal expansion, dielectric effects and contamination problems associated with ceramic insulation used in prior capacitance probes. If necessary as indicated, a ceramic insulator could be used in the cooler region remote from the metal cylinder within an aperture to restrict air flow through the air gap. It will be understood that a small flow of air could be used to prevent hot annulus gas ingestion into the air gap between the seal segment and capacitor.

Use of an amplifier that forms part of the oscillator circuit compensates for the high frequency electrical losses in the co-axial cable allowing the cable to be of a convenient length to allow isolation of the amplifier remotely from the sensor in accordance with aspects of the present invention.

FIG. 4 illustrates a two transistor amplifier, but it will be appreciated that arrangements could also be provided such that an amplifier is based upon a monolithic microwave amplifier module, or other suitable technology.

Figure 5:
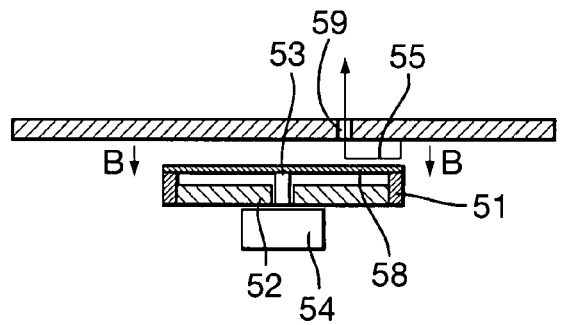
FIG. 5 is a schematic cross-section of an alternative sensor in accordance with aspects of the present invention.
Figure 6:
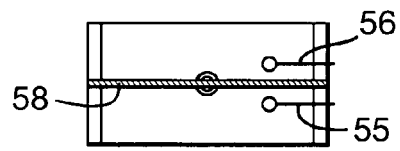
FIG. 6 is a schematic plan view across the sensor as depicted in FIG. 5.

It will also be understood that FIGS. 2 and 3 illustrate inductive coupling loops at both ends of the seal segment, but an alternative could be to provide an inductive coupling loop at one end as depicted in FIGS. 5 and 6 respectively illustrated in a side view and a plan view in the direction of arrowheads B as an alternative embodiment of the present invention. Thus, a capacitive sensor 52 is created by a metallic rod 53 associated with a seal segment 51 such that an effective half wavelength transmission line is created for the capacitive sensor 52 formed by the seal segment 51 and the rod 53 in association with a conductive member such as a blade tip 54. The sensor is again associated through a co-axial cable connection with appropriate amplifier and oscillator circuits using inductive coupling hoops 55, 56. In such circumstances, as previously, there is an effective nominal phase shift through the system in the order of 360° and therefore changes in the capacitance of the sensor are as a result of variations in the gap between the sensor and in particular the capacitive aspect 52 and the inductive member 54 generally in the form of a blade tip. A particular advantage of providing conductive coupling loops 55, 56 at one end of the sensor is that a single coupling aperture 59 is required in the casing adjacent to the seal element 51 rather than two as in the arrangement shown in FIGS. 2 and 3. This will reduce installation and manufacturing costs as well as potential problems with regard to stressing and leakage.

It will also be understood a single co-axial cable could be used if the appropriate coupling of the tuned circuit to the oscillator could be arranged. Essentially, it is necessary for the oscillator to be locked to the resonant frequency of the tuned circuit.

It will also be understood that an inductively coupled LC circuit could be used as part of a bridge arrangement where the absorption of radio frequency energy at the resonant frequency is detected by an imbalance in the bridge that utilised in order to determine variations in the gap between the conductive member and the sensor in accordance with aspects of the present invention.

FIGS. 7 and 8 illustrate a further alternative embodiment in accordance with aspects of the present invention in which a frequency scanning system sweeps an oscillator through the resonant frequency of the LC circuit and determines a dip in response when the oscillator is at the resonant frequency for the sensor current in view of the gap between the conductive member 54 and the metallic rod combining as a capacitive responder in accordance with aspects of the present invention.

As can be seen in FIG. 7 as previously a capacitive sensor 72 is created by a rod 73 integrally formed or associated with a seal segment housing 71 with a conductor 74. An inductive coupling 75 is provided in the manner previously described and connected through a co-axial cable 85 with a voltage controlled oscillator 86. This voltage controlled oscillator 86 in turn is coupled to a sweep oscillator 87 such that any response from the voltage controlled oscillator is given by a graph as depicted in FIG. 8 between power absorbed and frequency. As can be seen the power absorbed response provides dips 88, 89. Dip 88 responds to an aligned situation with regard to the sensor and in particular the seal segment 71 with the conductive member 74 typically in the form of a blade tip. Dip 89 (shown in broken lines) relates to an unaligned situation and therefore a displacement 90 in frequency between the dips corresponds to the gap between the sensor and the conductive member 74.

One aspect of the present invention is that a more accurately formed tuned circuit is provided for operation or use by integrally forming or creating a situation where thermal disparity changes do not alter the tuned circuit response themselves it will be understood that variations in the gap between the capacitive sensor and the conductive member can then with more certainty be determined. As indicated previously variations in the electrical coupling as well as insulators in other parts of the prior capacitive and other sensor types have resulted in either age limiting effects or potentially inaccurate results. By integrally forming or integrally associating the present sensor head in terms of the metal cylinder or rod it can be understood that these thermal disparity effects are averaged over the whole seal segment and so generally remain within the desired tuning range, that is to say wavelength proportioning for expected phase shift effects.

Low impedance inductive loops coupling the tuned circuit formed by the capacitive sensor and the $\sim^{1/4}\lambda$ tuned lines minimise detuning effects caused by relative movements between them.

An alternative embodiment would use capacitive coupling of the tuned circuit to the associated external circuit. This would require the replacement of the low impedance coupling loops with capacitors formed by electrodes connected to the coaxial cable inners and sections of the $\sim^{1/4}\lambda$ tuned line. In this case the couplings would be made near to the earthing end of the $\sim^{1/4}\lambda$ tuned lines to ensure a low impedance and minimise detuning effects caused by relative movement.

It will also be appreciated as depicted in FIG. 9 and FIG. 10 that a generated frequency modulated (FM) signal can be de-modulated by use of a tuned filter with a frequency roll-off configured to allow slope demodulation. As can be seen in FIG. 9 a sensor 100 is coupled by co-axial cable 101,102 to an amplifier 103 which in turn presents signals to a filter 104. In FIG. 9 signals from the filter 104 are presented to an amplitude modulation (AM) detector 105 for utilisation as control signals. However, as depicted in FIG. 10 amplitude variation 106 as a function of frequency can also result from filter loss due to frequency modulation (FM) from the oscillator. Thus, the use of a tuned filter as indicated with a known frequency roll-off can be configured to allow slope demodulation.

Although described principally with regard to a gas turbine engine it will be appreciated that a sensor in accordance with aspects of the present invention may also be utilised in other situations where variations in the gap between a conductive member and the capacitive sensor is required. As indicated a capacitor is created between the conductive member and the sensor in accordance with aspects of the present invention. Variations in the gap between this conductive member and the sensor will therefore vary the capacitive response of the sensor and therefore be utilised to provide an electrical sensor indicative of the gap. The electrical conductive member opposing a sensor in accordance with the present invention may be moving as with a turbine tip in a gas turbine engine or static.

We claim:

1. A rotor assembly having a rotational axis, comprising:
    a rotor, and
    a seal segment incorporating a sensor and positioned radially outwardly of the rotor, the seal segment and the rotor defining a gap,
    the sensor including a sensor head, a tuned circuit, a remote electronic circuit, and a low impedance inductive coupling loop, the sensor head being integral with the seal segment,
    the tuned circuit being arranged to have a frequency modulated electrical capacitance response relative to the gap, and being coupled to the remote electronic circuit by the low impedance inductive coupling loop such that the tuned circuit does not share a physical electrical connection with the remote electronic circuit.

2. A rotor assembly as claimed in claim 1 wherein the seal segment includes a seal element.

3. A rotor assembly as claimed in claim 1 wherein the sensor head comprises a metal rod or cylinder extending through an aperture in the seal segment.

4. A rotor assembly as claimed in claim 3 wherein there is a minimum clearance between the metal rod or cylinder and the aperture.

5. A rotor assembly as claimed in claim 3 wherein the metal rod or cylinder between an earthed end and a centre of the metal rod or cylinder has a length equivalent to a quarter wavelength of a signal at an oscillation frequency for the tuned circuit.

6. A rotor assembly as claimed in claim 1 wherein a capacitor is formed between the seal segment and the rotor.

7. A rotor assembly as claimed in claim 1 wherein the low impedance inductive coupling loop includes two low impedance inductive coupling loops, and the tuned circuit is coupled to the remote electronic circuit by the two low impedance inductive coupling loops.

8. A rotor assembly as claimed in claim 1 wherein the electronic circuit is an amplifier.

9. A rotor assembly as claimed in claim 7 wherein the two low impedance coupling loops are a fraction of an effective length between the earthed end and the centre of the metal rod or cylinder relative to an oscillating frequency of the tuned circuit.

10. A rotor assembly as claimed in claim 1 wherein the low impedance inductive coupling loop is also capacitive.

11. A rotor assembly as claimed in claim 1 wherein the sensor has a phase shift in an order of 360° in order to sustain oscillation.

12. A rotor assembly as claimed in claim 3 wherein the tuned circuit has an oscillation frequency, and the low impedance inductive coupling loop provides a multiple of half a wavelength of the oscillation frequency and the metal rod or cylinder has substantially a quarter of a wavelength of a pulse at the oscillation frequency.

13. A rotor assembly as claimed in claim 3 wherein there is an air gap between the metal od or cylinder and the aperture.

14. A rotor assembly as claimed in claim 3 wherein a ceramic seal is provided remote from the metal rod or cylinder and surrounding aperture association and positioned to inhibit leakage therethrough.

15. A rotor assembly as claimed in claim 14 wherein the ceramic seal is provided to accommodate high temperatures.

16. A rotor assembly as claimed in claim 1 wherein the sensor includes a voltage controlled oscillator and a sweep oscillator to enable a controller to determine variations in power absorption relative to frequency and so provide an indication as to gap spacing between the rotor and sensor head.

17. A rotor assembly as claimed in claim 1 wherein a generated FM signal is demodulated via the use of a tuned filter with a frequency roll-off configured to allow slope demodulation.

18. A gas turbine engine incorporating the rotor assembly as claimed in claim 1.

19. A rotor assembly as claimed in claim 1, wherein the low impedance inductive coupling loop couples the tuned circuit to the remote electronic circuit using electromagnetic induction.

20. A rotor assembly as claimed in claim 1, wherein the low impedance inductive coupling loop couples the tuned circuit to the remote electronic circuit across an air gap between the tuned circuit and the remote electronic circuit.

* * * * *